United States Patent
Oyama et al.

(10) Patent No.: US 10,747,222 B2
(45) Date of Patent: Aug. 18, 2020

(54) TRAVELING CONTROL SYSTEM

(71) Applicant: SUBARU CORPORATION, Tokyo (JP)

(72) Inventors: Hajime Oyama, Tokyo (JP); Ryosuke Namba, Tokyo (JP); Masato Mizoguchi, Tokyo (JP); Motoki Zaizen, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 78 days.

(21) Appl. No.: 16/209,645

(22) Filed: Dec. 4, 2018

(65) Prior Publication Data

US 2019/0278264 A1 Sep. 12, 2019

(30) Foreign Application Priority Data

Mar. 9, 2018 (JP) .................................. 2018-043333

(51) Int. Cl.
*G05D 1/00* (2006.01)
*G05D 1/02* (2020.01)
*G06K 9/00* (2006.01)

(52) U.S. Cl.
CPC ........... *G05D 1/0061* (2013.01); *G05D 1/021* (2013.01); *G06K 9/00798* (2013.01); *G05D 2201/0213* (2013.01)

(58) Field of Classification Search
None
See application file for complete search history.

(56) References Cited

U.S. PATENT DOCUMENTS 9,845,866 B2 * 12/2017 Drees .................. B60W 30/182
10,228,698 B2 * 3/2019 Mimura ................. G08G 1/167
(Continued)

FOREIGN PATENT DOCUMENTS

JP 2014-139795 A 7/2014
JP 2017-030518 A 2/2017
(Continued)

OTHER PUBLICATIONS

Japanese Notification of Reasons for Refusal issued in corresponding Japanese Patent Application No. 2018-043333, dated Aug. 20, 2019, with English translation.

*Primary Examiner* — Shelley Chen
(74) *Attorney, Agent, or Firm* — McDermott Will & Emery LLP

(57) ABSTRACT

A traveling control system includes a traveling controller, an operation detector, and an alarm controller. The traveling controller is configured to perform traveling control of a vehicle by selectively executing one mode of: a manual driving mode performing any of steering, acceleration, and deceleration of the vehicle in accordance with operation performed by a driver of the vehicle; the first driving assist mode performing automatic traveling control while requiring the driver to hold the steering wheel; and the second driving assist mode performing the automatic traveling control without requiring the driver to hold the steering wheel. The automatic traveling control includes control of any of the steering, the acceleration, and the deceleration of the vehicle. The operation detector is configured to detect the operation performed by the driver. The alarm controller is configured to control a notification unit of the vehicle, to output any of visual and auditory information.

2 Claims, 2 Drawing Sheets

(56) References Cited

U.S. PATENT DOCUMENTS

| | | | |
|---|---|---|---|
| 10,261,513 B2* | 4/2019 | Reiley | G05D 1/0061 |
| 10,449,970 B2* | 10/2019 | Urano | B60W 50/0098 |
| 2015/0283998 A1* | 10/2015 | Lind | B60W 30/17 |
| | | | 701/23 |
| 2016/0091083 A1* | 3/2016 | Drees | B60K 28/06 |
| | | | 74/473.18 |
| 2017/0144568 A1* | 5/2017 | Torii | B60N 2/77 |
| 2017/0315556 A1* | 11/2017 | Mimura | H04N 1/00212 |
| 2018/0079358 A1* | 3/2018 | Kelly | B60Q 9/00 |
| 2018/0105184 A1* | 4/2018 | Urano | B60W 50/082 |
| 2018/0173237 A1* | 6/2018 | Reiley | G05D 1/0061 |
| 2018/0312161 A1* | 11/2018 | Asakura | G08G 1/096725 |
| 2019/0039618 A1 | 2/2019 | Mori | |

FOREIGN PATENT DOCUMENTS

| | | | |
|---|---|---|---|
| JP | 2017-159885 A | | 9/2017 |
| JP | 2019175097 A | * | 10/2019 |
| WO | 2018/042592 A1 | | 3/2018 |

* cited by examiner

TRAVELING CONTROL SYSTEM

CROSS-REFERENCE TO RELATED APPLICATIONS

The present application claims priority from Japanese Patent Application No. 2018-043333 filed on Mar. 9, 2018, the entire contents of which are hereby incorporated by reference.

BACKGROUND

The technology relates to a traveling control system that executes vehicle automatic traveling control.

There has been a traveling control system for a vehicle, such as an automobile, that performs automatic driving of the vehicle without requiring a driver to hold a steering wheel. There has also been another traveling control system that involves alerting a driver to switching from automatic driving to manual driving when the switching occurs, as disclosed, for example, in Japanese Unexamined Patent Application Publication No. 2017-030518.

SUMMARY

An aspect of the technology provides a traveling control system that includes a traveling controller, an operation detector, and an alarm controller. The traveling controller is configured to perform traveling control of a vehicle equipped with a steering wheel by selectively executing one mode of a manual driving mode, a first driving assist mode, and a second driving assist mode. The manual driving mode performs any of steering, acceleration, and deceleration of the vehicle in accordance with operation performed by a driver of the vehicle. The first driving assist mode performs automatic traveling control while requiring the driver to hold the steering wheel. The automatic traveling control includes control of the steering, the acceleration, and the deceleration of the vehicle. The second driving assist mode performs the automatic traveling control without requiring the driver to hold the steering wheel. The operation detector is configured to detect the operation performed by the driver. The alarm controller is configured to control a notification unit provided to the vehicle, to output any of visual information and auditory information. The traveling controller performs, when it is determined that the second driving assist mode is non-continuable during execution of the second driving assist mode, mode switching from the second driving assist mode to either one of the manual driving mode and the first driving assist mode. The mode switching is performed to switch the selectively-executed mode in which the traveling control of the vehicle is performed. The traveling controller determines, upon or a predetermined time period before execution of the mode switching, whether the driver is taking a posture to respond to the mode switching to either one of the manual driving mode and the first driving assist mode, on the basis of a result of the detection, performed by the operation detector, of the operation performed by the driver. The traveling controller controls, when the traveling controller determines that the driver is not taking the posture, the alarm controller to allow for notification of the execution of the mode switching by using both the visual information and the auditory information. The traveling controller controls, when the traveling controller determines that the driver is taking the posture, the alarm controller to allow for notification of the execution of the mode switching by using only the visual information.

DETAILED DESCRIPTION

Figure 1:
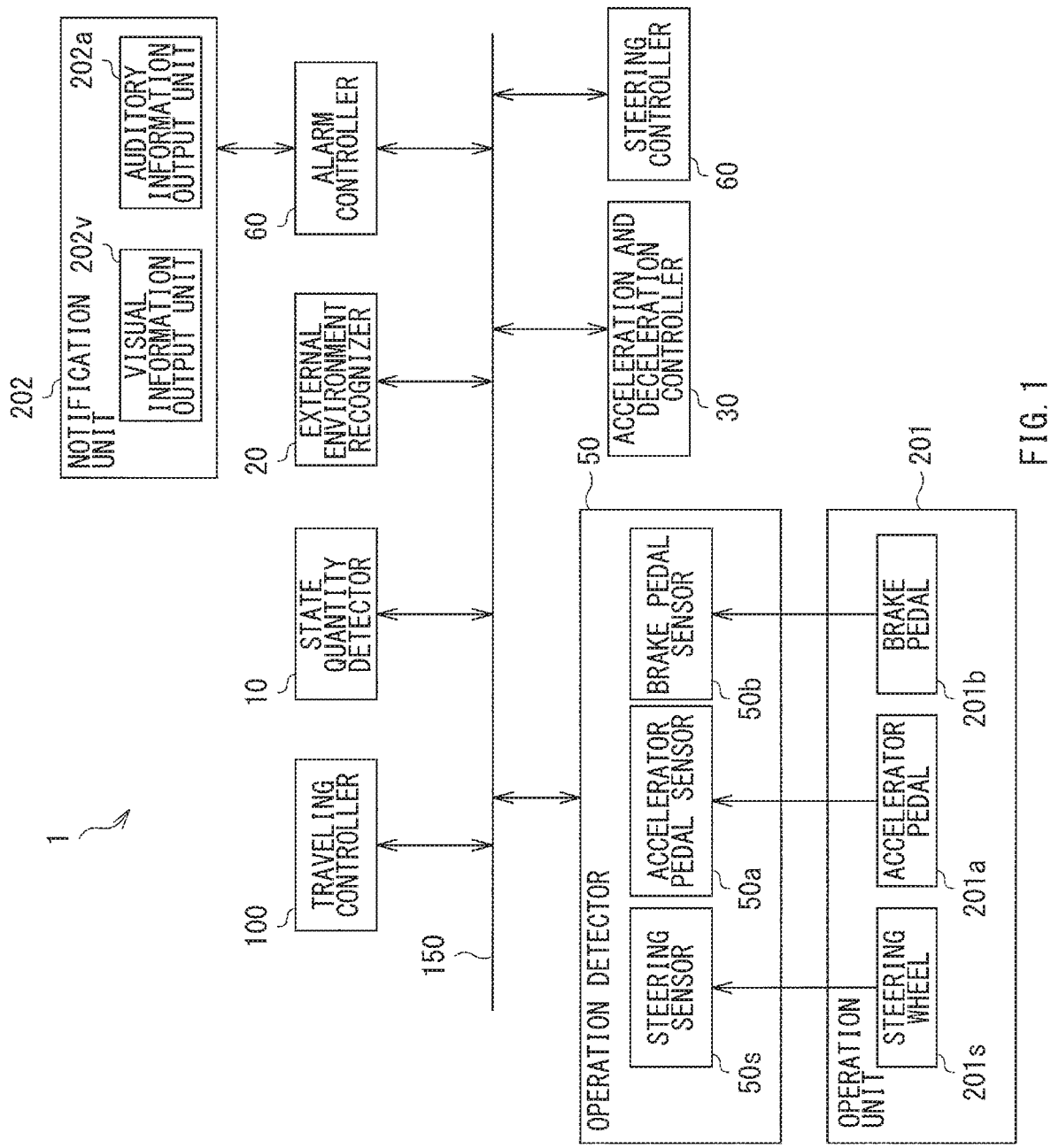
FIG. 1 is a diagram illustrating an example of a configuration of a traveling control system.

In the following, some example implementations of the technology are described in detail with reference to the accompanying drawings. Note that the following description is directed to illustrative examples of the disclosure and not to be construed as limiting to the technology. Factors including, without limitation, numerical values, shapes, components, positions of the components, ratios in size of the components, relative positional relationship between the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. The components in the drawings have scales in order to allow the components to have respective sizes that are recognizable in the drawings. Throughout the present specification and the drawings, elements having substantially the same function and configuration are denoted with the same reference numerals to avoid any redundant description.

While a driver drives a vehicle by automatic driving, the driver can predict, on the basis of, for example, map information or the driver's experience, a point where switching is to occur from the automatic driving to manual driving. Thus, the driver may possibly hold the steering wheel as preparation before the own vehicle reaches the point where the switching is to occur from the automatic driving to the manual driving. However, although the driver is already holding the steering wheel to prepare for the switching from the automatic driving to the manual driving, a typical traveling control system gives an alarm to request the driver to hold the steering wheel, which may annoy the driver in some cases.

It is desirable to provide a traveling control system that enables switching of a content of an alarm depending on a posture of a driver at the time when switching of a driving mode is performed.

FIG. 1 illustrates a traveling control system 1 for a vehicle such as an automobile. The traveling control system 1 may execute traveling control that includes autonomous automatic driving of the vehicle. The vehicle equipped with the traveling control system 1 may be referred to an "own vehicle" hereinafter.

The own vehicle may include an operation unit 201 with which a driver performs a driving operation. The operation unit 201 may include an accelerator pedal 201a, a brake pedal 201b, and a steering wheel 201s. In one example implementation, the operation unit 201 may also include a switch with which operation of switching between manual driving and automatic driving of the own vehicle is performed.

The traveling control system 1 may include a traveling controller 100, a state quantity detector 10, an external environment recognizer 20, an acceleration and deceleration controller 30, a steering controller 40, an operation detector 50, an alarm controller 60, and any other unit that may be mutually connected via an information communication network 150.

The state quantity detector 10 may include, for example, a vehicle speed sensor, an acceleration sensor, an angular speed sensor, a steering angle sensor, and any other component and may detect state quantities such as a vehicle speed of the own vehicle, acceleration in a front-rear direction, a yaw rate, or a steering angle. One or multiple of the multiple sensors of the state quantity detector 10 may also serve as sensors belonging to another unit of the own vehicle. For example, the angular speed sensor of the state quantity detector 10, which detects a yaw rate of the own vehicle, may also serve as an angular speed sensor belonging to a skid prevention unit of the own vehicle.

The external environment recognizer 20 may recognize a road shape in front of the own vehicle, and a location and a shape of an object surrounding the own vehicle, on the basis of information from a sensor that recognizes an external environment of the own vehicle and information from any other unit. The external environment recognizer 20 may output the result of the recognition. The external environment recognizer 20 may recognize a road shape in front of the own vehicle, a location and a shape of an object, and any other matter, for example, by applying known image processing to an image taken by a camera. The external environment recognizer 20 may also recognize a location of an object surrounding the own vehicle by using a radar system such as millimeter wave radar or a LiDAR.

In one example implementation, the external environment recognizer 20 may use location information of the own vehicle, which is detected by a positioning system such as a global navigation satellite system (GNSS), and preliminarily stored map information, to recognize a road shape in front of the own vehicle. In one example implementation, the external environment recognizer 20 may also recognize a road shape in front of the own vehicle by using information obtained by means of wireless communication with an external infrastructure such as road-to-vehicle communication.

The acceleration and deceleration controller 30 may be an electronic controller that controls operation of a prime motor and a braking device of the own vehicle on the basis of operation performed by the driver on the operation unit 201 and an instruction output from the traveling controller 100. Details of the traveling controller 100 will be described later. The acceleration and deceleration controller 30 may control acceleration, deceleration, start, and stop of the own vehicle. In other words, the acceleration and deceleration controller 30 may control the movement of the own vehicle in the front-rear direction.

The prime motor equipped on the own vehicle may be one or multiple internal combustion engines, one or multiple electric motors, or a combination thereof. Non-limiting examples of the braking device may include one that generates braking force by converting kinetic energy of the own vehicle into thermal energy or one that converts kinetic energy of the own vehicle into electric energy.

An example of the acceleration and deceleration controller 30 for actual use may include multiple electronic controllers, e.g., an electronic controller that controls the prime motor and an electronic controller that controls the braking device. These electronic controllers may operate cooperatively via the information communication network 150 to implement the acceleration and deceleration controller 30.

The steering controller 40 may be an electronic controller that controls operation of a steering device of the own vehicle on the basis of operation performed by the driver on the controller 201 and an instruction output from the later-described traveling controller 100. The steering device may include a unit that adds a yaw moment to the own vehicle in accordance with a change in steering angle and may further include a unit that adds a yaw moment to the own vehicle in accordance with generation of a difference in braking force or in driving force between left and right wheels. The steering controller 40 may control a yaw moment of the own vehicle, which is generated by the operation of the steering device. In other words, the steering controller 40 may control the movement of the own vehicle in a left-right direction.

The operation detector 50 may detect the operation performed by the driver on the operation unit 201. The operation detector 50 may include an accelerator pedal sensor 50*a* that detects operation performed on the accelerator pedal 201*a*, a brake pedal sensor 50*b* that detects operation performed on the brake pedal 201*b*, and a steering sensor 50*s* that detects operation performed on the steering wheel 201*s*. Part or all of the components of the operation detector 50 may also serve as the components of the state quantity detector 10.

The accelerator pedal sensor 50*a* may detect, for example, a depressed amount of the accelerator pedal 201*a*. The brake pedal sensor 50*b* may detect, for example, a brake hydraulic pressure. The steering sensor 50*s* may be a steering torque sensor that detects torque applied to the steering wheel 201*s* by the driver, for example.

In one example implementation, the brake pedal sensor 50*b* may include a switch that detects operation performed on the brake pedal 201*b* to control lighting of a brake light of the own vehicle. The steering sensor 50*s* may also include a touch sensor that is provided to the steering wheel 201*s*.

The alarm controller 60 may be an electronic controller that controls a notification unit 202 that outputs visual information and auditory information directed to the driver. The notification unit 202 may include at least a visual information output unit 202*v* and an auditory information output unit 202*a*. The visual information output unit 202*v* may include one or both of a display that displays contents such as an image or a text and a light emitter that emits light. The auditory information output unit 202*a* may output a sound. The notification unit 202 may further include any other unit. In one example implementation, the notification unit 202 may further include an actuator that generates vibrations.

The traveling controller 100 may be an electronic controller that controls the acceleration and deceleration controller 30 and the steering controller 40 to perform traveling control of the own vehicle. The traveling controller 100 may control the acceleration and deceleration controller 30 and the steering controller 40 on the basis of information including state quantities of the own vehicle that are detected by the state quantity detector 10, the result of the recognition of the external environment of the own vehicle performed by the external environment recognizer 20, and the result of the recognition, performed by the operation detector 50, of the operation performed on the operation unit 201.

The traveling controller 100 of an example implementation of the technology have multiple driving modes or controlling modes, which include a manual driving mode, a first driving assist mode, and a second driving assist mode.

The traveling controller 100 selectively executes one mode of these modes to perform traveling control of the own vehicle.

The traveling control of the own vehicle may include at least control of acceleration and deceleration of the own vehicle and control of steering of the own vehicle. In some cases, the traveling control of the own vehicle may also include execution of a response to the result of the recognition of the external environment of the own vehicle.

The manual driving mode may cause the driver to operate the operation unit 201 to control acceleration and deceleration, steering, or both, of the own vehicle. That is, the manual driving mode may encompass a case where the driver performs all of the traveling control of the own vehicle and a case where the driver performs part of the traveling control of the own vehicle while the traveling controller 100 performs the rest of the traveling control. According to a definition of an automobile driving automation level in SAE (J3016_201609 by SAE), the former case may correspond to the "level 0", and the latter case may correspond to the "level 1". Hereinafter, the driving automation levels defined by SAE are referred to as "SAE level 0", "SAE level 1", and so on.

The manual driving mode may require the driver to recognize the external environment of the own vehicle and to determine a response to the result of the recognition of the external environment.

The first driving assist mode may correspond to the "SAE level 2". That is, the first driving assist mode may cause the traveling controller 100 to control acceleration and deceleration of the own vehicle and also to control steering of the own vehicle, while requiring the driver to recognize the external environment of the own vehicle and to determine a response to the result of the recognition of the external environment.

For example, the traveling controller 100 according to the example implementation may require the driver to hold the steering wheel 201s when the first driving assist mode is executed. In other words, the traveling controller 100 of the example implementation may be able to execute the first driving assist mode on a condition that the steering sensor 50s detects holding of the steering wheel 201s by the driver. Thus, the first driving assist mode may execute automatic traveling control while requiring the driver to hold the steering wheel 201s.

The second driving assist mode may correspond to any of the "SAE level 3" and the "SAE level 4". That is, the second driving assist mode may cause the traveling controller 100 to control acceleration and deceleration of the own vehicle and to control steering of the own vehicle. The second driving assist mode may also cause the traveling controller 100 to recognize the external environment of the own vehicle and to determine a response to the result of the recognition of the external environment.

That is, the second driving assist mode may execute automatic traveling control without requiring the driver to hold the steering wheel 201s.

The traveling controller 100 may selectively execute one mode of the manual driving mode, the first driving assist mode, and the second driving assist mode, for example, in accordance with an instruction that is input by the driver using the operation unit 201.

In one example of the example implementation of the technology, the second driving assist mode may be set to correspond to the "SAE level 3". Thus, when the automatic traveling control in the second driving assist mode is non-continuable during execution of the second driving assist mode by the traveling controller 100, the traveling controller 100 may terminate the execution of the second driving assist mode, and start either one of the manual driving mode and the first driving assist mode. In other words, when the second driving assist mode is non-continuable, the traveling controller 100 may make a transition to the driving mode that requires the driver to hold the steering wheel 201s. At the time of making the transition to the driving mode that requires the driver to hold the steering wheel 201s, the traveling controller 100 may control the alarm controller 60 to notify the driver of termination of the second driving assist mode and of the need for holding the steering wheel 201s. Details of notification at the time of making the transition to the driving mode that requires the driver to hold the steering wheel 201s will be described later.

Non-limiting examples of the case where the second driving assist mode is non-continuable during the execution of the second driving assist mode may include a case where the own vehicle exits from a predetermined road that corresponds to the automatic driving, or a case where recognition of a road shape by the external environment recognizer 20 becomes difficult due to a cause such as accumulated snow. Non-limiting examples of the predetermined road corresponding to the automatic driving may include a road in which it is relatively easy to execute the automatic driving, such as a road exclusive for automobiles, or a road with infrastructure such as signs for the automatic driving or a road-to-vehicle communication equipment.

Figure 2:
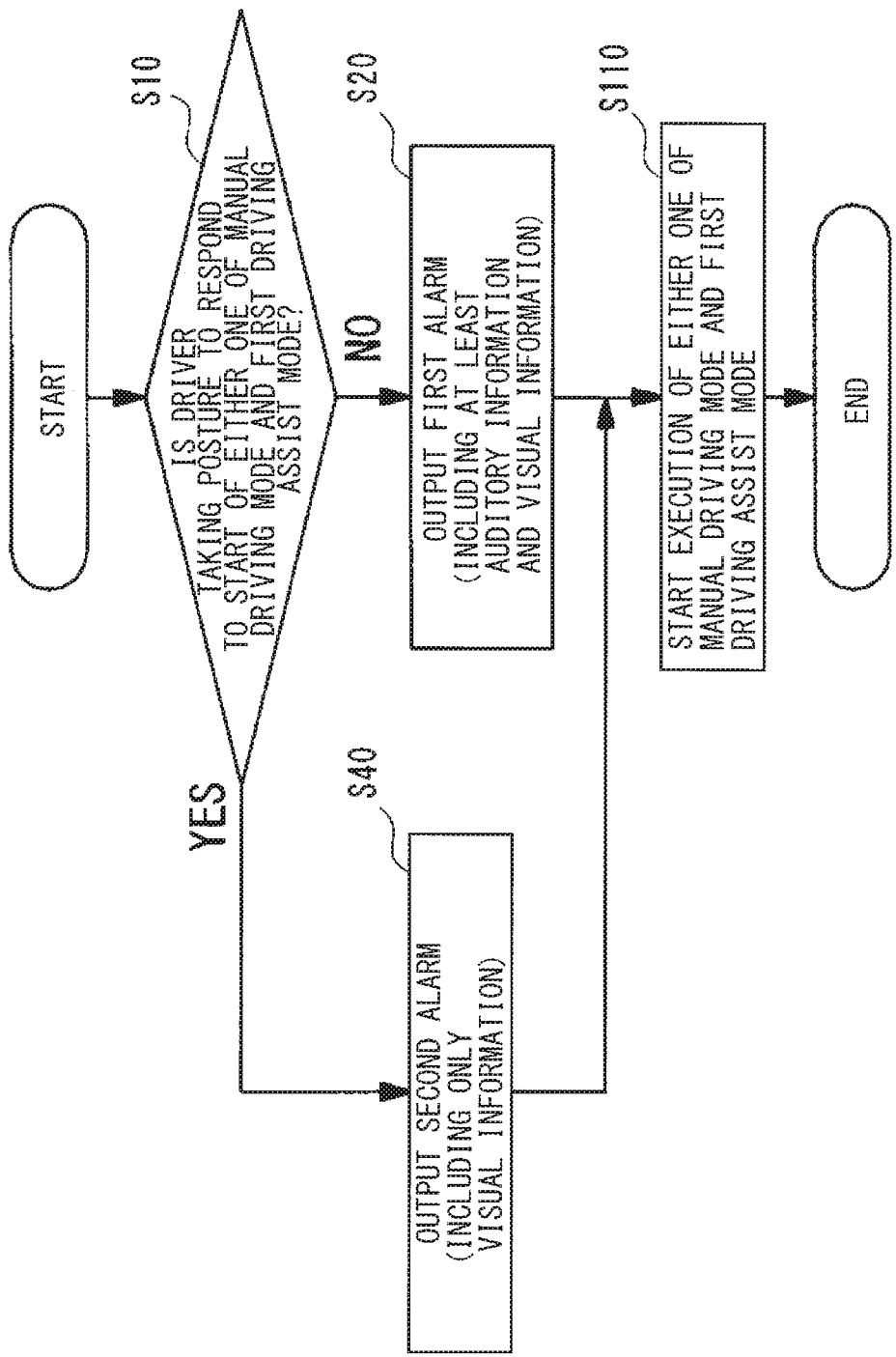
FIG. 2 is a flowchart illustrating an example if a process of terminating automatic driving.

FIG. 2 is a flowchart illustrating a process of terminating the automatic driving which is executed by the traveling controller 100. The process of terminating the automatic driving may be executed in any of: a case where the second driving assist mode is determined as non-continuable during the execution of the second driving assist mode; and a case where the second driving assist mode is expected to become non-continuable in a predetermined time during the execution of the second driving assist mode.

In other words, the traveling controller 100 may execute the process of terminating the automatic driving illustrated in FIG. 2 when the traveling controller 100 makes a transition from the automatic traveling control that requires no holding of the steering wheel 201s by the driver to the automatic traveling control or the manual traveling control that requires holding of the steering wheel 201s by the driver. At the start of the process of terminating the automatic driving illustrated in FIG. 2, the traveling controller 100 may be still executing the second driving assist mode.

The process of terminating the automatic driving may involve the following steps. First, in step S10, the traveling controller 100 may determine whether the driver is already taking a posture for the start of either one of the manual driving mode and the first driving assist mode that requires the driver to hold the steering wheel 201s. This determination may be made on the basis of the result of the detection performed by the operation detector 50. In other words, in step S10, the traveling controller 100 may determine whether the driver is taking a posture to respond to the termination of the automatic driving corresponding to the "SAE level 3" and subsequent start of the control corresponding to any of the "SAE levels 0" to the "SAE level 2".

In one example of the present example implementation of the technology, in step S10, whether the driver is holding the steering wheel 201s may be determined on the basis of the result of the detection performed by the steering sensor 50s. When the holding of the steering wheel 201s by the driver is detected by the steering sensor 50s in step S10, the traveling controller 100 may determine that the driver is already taking the posture for the start of either one of the manual driving mode and the first driving assist mode.

When the traveling controller 100 determines that the driver is not taking the posture for the start of either one of the manual driving mode and the first driving assist mode in step S10, the traveling controller 100 may proceed to step S20.

In step S20, the traveling controller 100 may control the alarm controller 60 to cause the notification unit 202 to output a first alarm using at least visual information and auditory information. That is, the first alarm output in step S20 may include one or both of an alarming sound and a voice sound that are output from the auditory information output unit 202a, and one or both of an image and light that are output from the visual information output unit 202v. The image output from the visual information output unit 202v may include a text. The first alarm may further include any other information. In one example, the first alarm may further include vibrations of a seat or vibrations of the steering wheel 201s. The vibrations may be generated by an actuator.

The first alarm may notify the driver of the termination of the traveling control that requires no holding of the steering wheel 201s by the driver and may also notify the requiring of the holding of the steering wheel 201s by the driver. The visual information and the auditory information in the first alarm are not particularly limited. For example, the visual information and the auditory information in the first alarm may have any shape of an image or any pattern of a voice sound.

Non-limiting examples of a condition to stop the first alarm output as a result of the execution of the process in step S20 may include a lapse of a predetermined time or detection of holding of the steering wheel 201s by the driver.

In step S110, the traveling controller 100 may start execution of either one of the manual driving mode and the first driving assist mode. The execution of the process in step S110 may bring the process of terminating the automatic driving to an end.

The timing to execute the process in step S110 may vary depending on a factor such as the vehicle speed of the own vehicle or the location of the own vehicle relative to a point where the automatic traveling control in the second driving assist mode is expected to be non-continuable, and this timing is not particularly limited. For example, the process in step S110 may be possibly executed substantially at the same time as the execution of the process in step S20 in a case where the own vehicle is located near the point where the automatic traveling control in the second driving assist mode is expected to be non-continuable at the time of the start of the process of terminating the automatic driving. Non-limiting example of the foregoing case may include a situation where a factor such as locally-accumulated snow suddenly makes it difficult for the external environment recognizer 20 to recognize a road shape. In one example implementation, the process in step S20 may be executed a predetermined time before the planned time to execute the process in step S110 in a case where the point where the automatic traveling control in the second driving assist mode becomes non-continuable is predictable. Non-limiting examples of the foregoing case may include a situation where the own vehicle exits from a predetermined road that corresponds to the automatic driving.

In contrast, when the traveling controller 100 determines that the driver is taking the posture for the start of either one of the manual driving mode and the first driving assist mode in step S10, the traveling controller 100 may proceed to step S40.

In step S40, the traveling controller 100 may control the alarm controller 60 to cause the notification unit 202 to output a second alarm using only visual information. That is, the second alarm output in step S40 may include only one or both of the image and the light that are output from the visual information output unit 202v. The image output from the visual information output unit 202v may include a text. Thus, the second alarm may not include a warning sound, a voice sound, vibration, etc.

The second alarm may notify the driver of the termination of the traveling control that requires no holding of the steering wheel 201s by the driver. The visual information in the second alarm is not particularly limited. For example, the visual information in the second alarm may have any shape of an image.

Non-limiting examples of a condition to stop the second alarm output as a result of the execution of the process in step S40 may be, for example, a lapse of a predetermined time.

In step S110, the traveling controller 100 may start execution of either one of the manual driving mode and the first driving assist mode. The execution of the process in step S110 may bring the process of terminating the automatic driving to an end.

As described above, the timing to execute the process in step S110 may vary depending on a factor such as the vehicle speed of the own vehicle or the location of the own vehicle relative to the point where the automatic traveling control in the second driving assist mode is expected to be non-continuable, and this timing is not particularly limited.

As described above, the traveling controller 100 performs mode switching from the second driving assist mode to either one of the manual driving mode and the first driving assist mode (step S110) when it is determined that the second driving assist mode is non-continuable during execution of the second driving assist mode. The mode switching may be a process of switching of a driving condition from the automatic driving condition at any of the "SAE level 3" and the "SAE level 4" that requires no holding of the steering wheel 201s by the driver, to the driving condition at any of the "SAE level 0" to the "SAE level 2" that requires holding of the steering wheel 201s by the driver.

Further, upon or a predetermined time period before the execution of the mode switching, the traveling controller 100 determines whether the driver is taking a posture to respond to the mode switching to either one of the manual driving mode and the first driving assist mode, on the basis of the result of the detection, performed by the operation detector 50, of the operation performed by the driver (step S10).

Further, when the traveling controller 100 determines that the driver is not taking the posture to respond to the mode switching to either one of the manual driving mode and the first driving assist mode, the traveling controller 100 controls the alarm controller 60 to notify the execution of the mode switching by using both the visual information and the auditory information (step S20). When the traveling controller 100 determines that the driver is taking the posture, the traveling controller 100 controls the alarm controller 60 to notify the execution of the mode switching by using only the visual information (step S40).

The traveling control system 1 of the example implementation of the technology may be thus configured. When the switching from the second driving assist mode to either one of the manual driving mode and the first driving assist mode is performed while the own vehicle equipped with the traveling control system 1 travels, the traveling control system 1 may output an alarm to notify the switching.

In the example implementation of the technology, in the condition that the driver is taking the posture to respond to the start of either one of the manual driving mode and the first driving assist mode by holding the steering wheel 201*s* or by any other manner, the alarm to be output by the traveling control system 1 may be the second alarm using only the visual information.

Accordingly, the alarm output by the traveling control system 1 to notify the termination of the second driving assist mode is decreased in stimulation to the driver, for example, when the driver expects the point where the second driving assist mode becomes non-continuable on the basis of, for example, map information or the driver's experience, and prepares for the termination of the second driving assist mode by holding the steering wheel 201*s*. This prevents the driver from being annoyed by the alarm.

In contrast, the alarm output by the traveling control system 1 to notify the termination of the second driving assist mode includes both the auditory information and the visual information and is therefore increased in stimulation to the driver, for example, when the driver does not prepare for the termination of the second driving assist mode. This enables the driver to immediately recognize the termination of the second driving assist mode.

As described above, according to the traveling control system 1 of the example implementation of the technology, it is possible to enable switching of the content of an alarm depending on a posture of a driver at the time when switching of a driving mode is performed.

Although some implementations of the technology have been described in the foregoing by way of example with reference to the accompanying drawings, the technology is by no means limited to the implementations described above. It should be appreciated that modifications and alterations may be made by persons skilled in the art without departing from the gist and the idea of the technology understood based on the appended claims and the entire specification. The technology is intended to include such modifications and alterations of the traveling control apparatus in so far as they fall within the scope of the appended claims or the equivalents thereof.

Each of the traveling controller 100, the acceleration and deceleration controller 30, the steering controller 40, and the alarm controller 60 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each the traveling controller 100, the acceleration and deceleration controller 30, the steering controller 40, and the alarm controller 60 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the traveling controller 100, the acceleration and deceleration controller 30, the steering controller 40, and the alarm controller 60 illustrated in FIG. 1.

The invention claimed is:

1. A traveling control system comprising:
    a traveling controller configured to perform traveling control of a vehicle equipped with a steering wheel by selectively executing one mode of a manual driving mode, a first driving assist mode, and a second driving assist mode, the manual driving mode performing any of steering, acceleration, and deceleration of the vehicle in accordance with operation performed by a driver of the vehicle, the first driving assist mode performing automatic traveling control while requiring the driver to hold the steering wheel, the automatic traveling control including control of the steering, the acceleration, and the deceleration of the vehicle, the second driving assist mode performing the automatic traveling control without requiring the driver to hold the steering wheel;
    an operation detector configured to detect the operation performed by the driver; and
    an alarm controller configured to control a notification unit provided to the vehicle, to output any of visual information and auditory information,
    the traveling controller performing, when it is determined that the second driving assist mode is non-continuable during execution of the second driving assist mode, mode switching from the second driving assist mode to either one of the manual driving mode and the first driving assist mode, the mode switching being performed to switch the selectively-executed mode in which the traveling control of the vehicle is performed,
    the traveling controller determining, upon or a predetermined time period before execution of the mode switching, whether the driver is taking a posture to respond to the mode switching to either one of the manual driving mode and the first driving assist mode, on a basis of a result of the detection, performed by the operation detector, of the operation performed by the driver,
    the traveling controller controlling, when the traveling controller determines that the driver is not taking the posture, the alarm controller to allow for notification of the execution of the mode switching by using both the visual information and the auditory information,
    the traveling controller controlling, when the traveling controller determines that the driver is taking the posture, the alarm controller to allow for notification of the execution of the mode switching by using only the visual information.

2. The traveling control system according to claim 1, wherein
    the operation detector includes a steering sensor that is configured to detect holding of the steering wheel by the driver, and
    the traveling controller determines that the driver is taking the posture when the steering sensor detects the holding of the steering wheel by the driver.

* * * * *